United States Patent
Nonoshita

(10) Patent No.: US 8,828,169 B2
(45) Date of Patent: Sep. 9, 2014

(54) HOLLOW COMPOSITE BICYCLE COMPONENT

(75) Inventor: Tetsu Nonoshita, Osaka (JP)

(73) Assignee: Shimano Inc., Osaka (JP)

( * ) Notice: Subject to any disclaimer, the term of this patent is extended or adjusted under 35 U.S.C. 154(b) by 563 days.

(21) Appl. No.: 12/826,787

(22) Filed: Jun. 30, 2010

(65) Prior Publication Data

US 2012/0003408 A1 Jan. 5, 2012

(51) Int. Cl.
*B62K 19/10* (2006.01)
*B62K 19/16* (2006.01)

(52) U.S. Cl.
CPC ............. *B62K 19/10* (2013.01); *B62K 19/16* (2013.01); *B62K 2700/10* (2013.01); *A62M 3/00* (2013.01)
USPC ............ 156/156; 156/185; 156/187; 156/285

(58) Field of Classification Search
USPC ............. 156/156, 185, 285, 187, 191, 172
See application file for complete search history.

(56) References Cited

U.S. PATENT DOCUMENTS

| | | | | |
|---|---|---|---|---|
| 3,224,000 | A | * | 12/1965 | Bloetscher et al. ............ 156/165 |
| 3,354,458 | A | * | 11/1967 | Rottmayer ...................... 342/10 |
| 4,348,247 | A | * | 9/1982 | Loyd et al. ..................... 156/156 |
| 5,762,352 | A | | 6/1998 | Lee |
| 6,213,488 | B1 | * | 4/2001 | Filice et al. ................. 280/281.1 |
| 2003/0094067 | A1 | | 5/2003 | Whiting et al. |
| 2004/0082394 | A1 | | 4/2004 | Lee et al. |
| 2006/0103106 | A1 | * | 5/2006 | Schlanger ...................... 280/259 |
| 2007/0241530 | A1 | | 10/2007 | Nonoshita et al. |
| 2008/0238029 | A1 | | 10/2008 | Inoue et al. |
| 2008/0261733 | A1 | * | 10/2008 | Filippini ....................... 473/540 |

FOREIGN PATENT DOCUMENTS

| EP | 1378433 A1 * | 1/2004 |
|---|---|---|
| EP | 1419961 A1 * | 5/2004 |
| TW | 461866 B | 11/2001 |

OTHER PUBLICATIONS

European Search Report of corresponding EP Application No. 11 15 9152.5 dated Oct. 6, 2011.

* cited by examiner

*Primary Examiner* — Jeff Aftergut
(74) *Attorney, Agent, or Firm* — Global IP Counselors

(57) ABSTRACT

A hollow composite bicycle component is provided that basically provided with a hollow metallic member, a fiber-reinforced polymer member and a heat-ductile member. The fiber-reinforced polymer member is positioned inside the hollow metallic member. The heat-ductile member is positioned inside the fiber-reinforced polymer member, with the fiber-reinforced polymer member being adhered to an inner surface of the hollow metallic member. The fiber-reinforced polymer member is preferably adhered to the inner surface of the hollow metallic member by disposing the heat-ductile member with the fiber-reinforced polymer member disposed on the heat-ductile member within the hollow metallic member, and then heating heat-ductile member to expand the fiber-reinforced polymer member into contact with the inner surface of the metallic member.

8 Claims, 9 Drawing Sheets

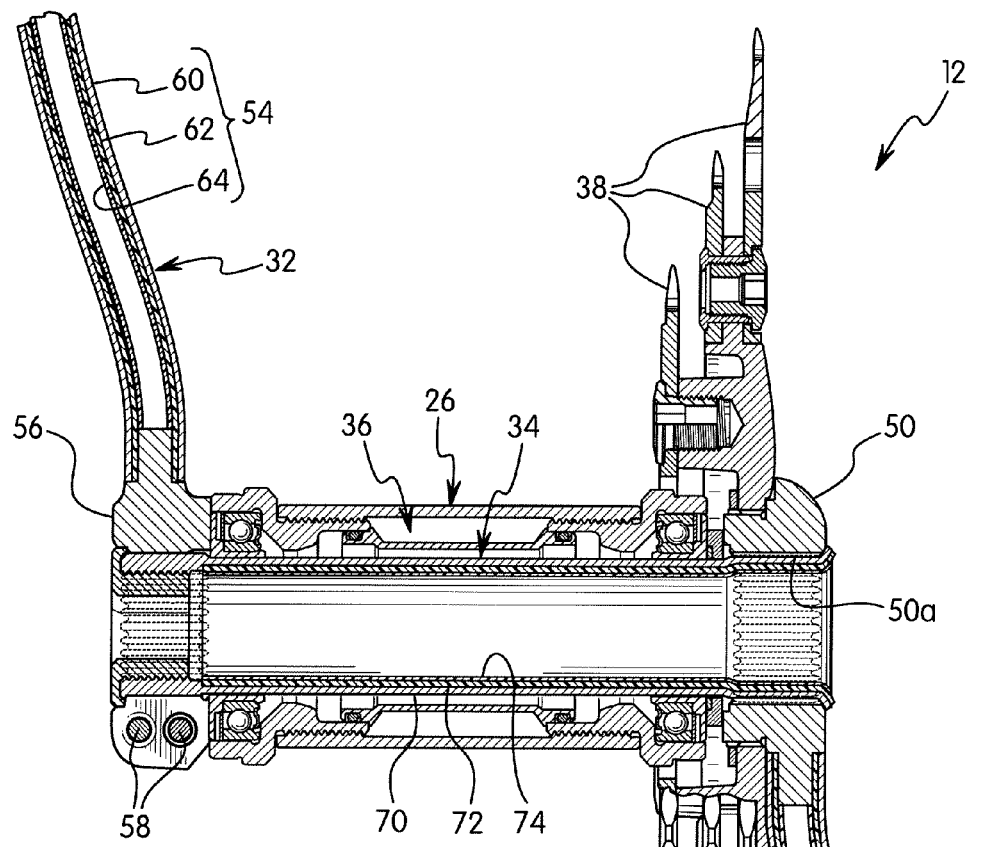
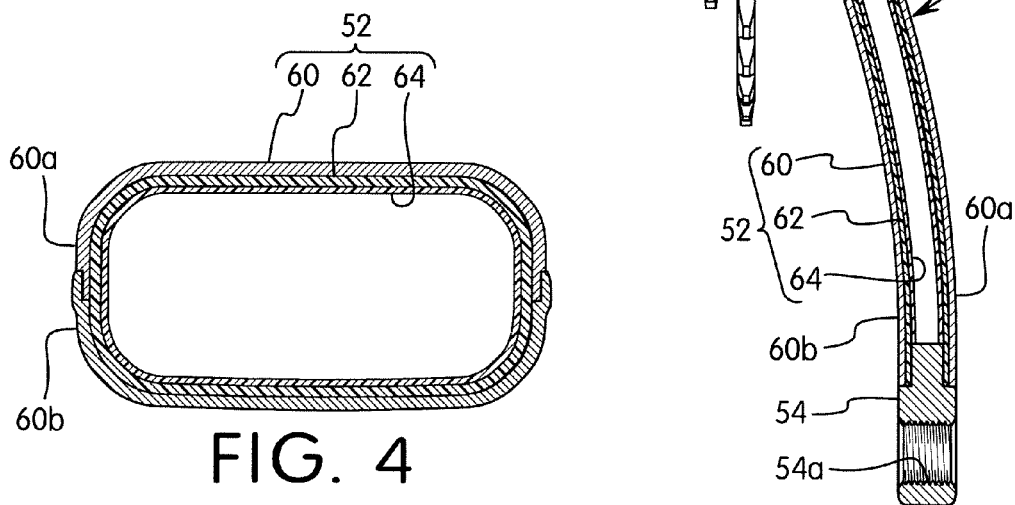
FIG. 3
FIG. 4

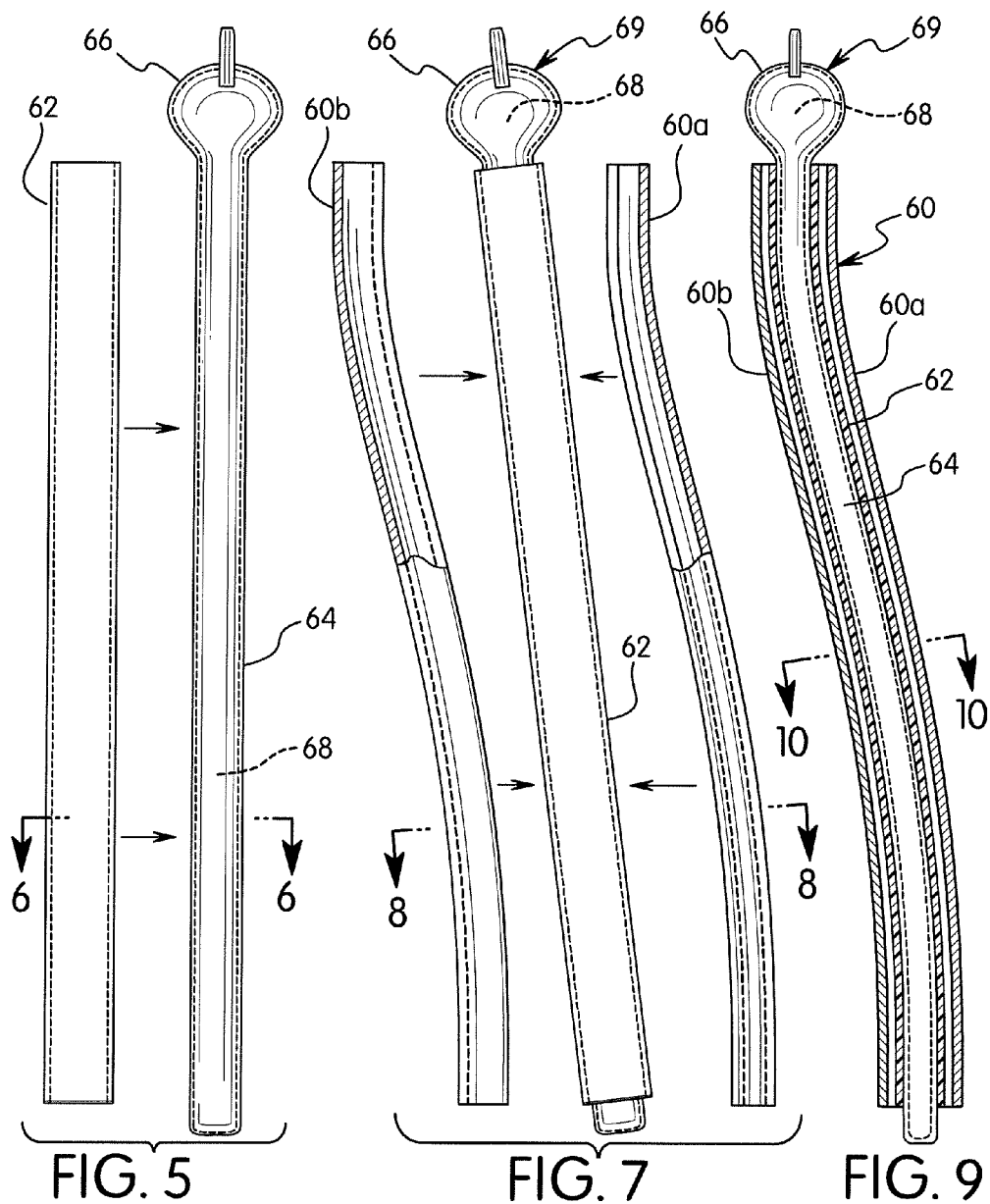
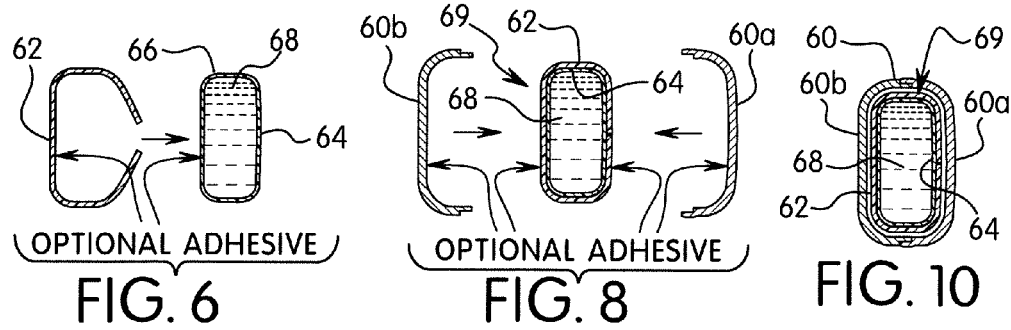

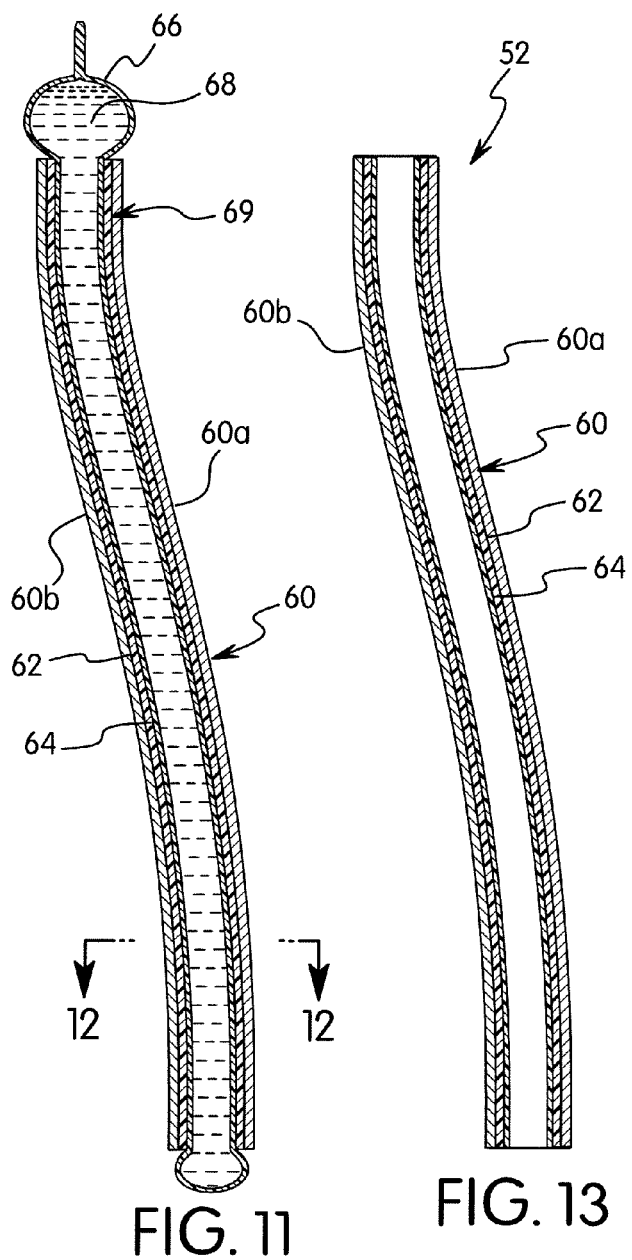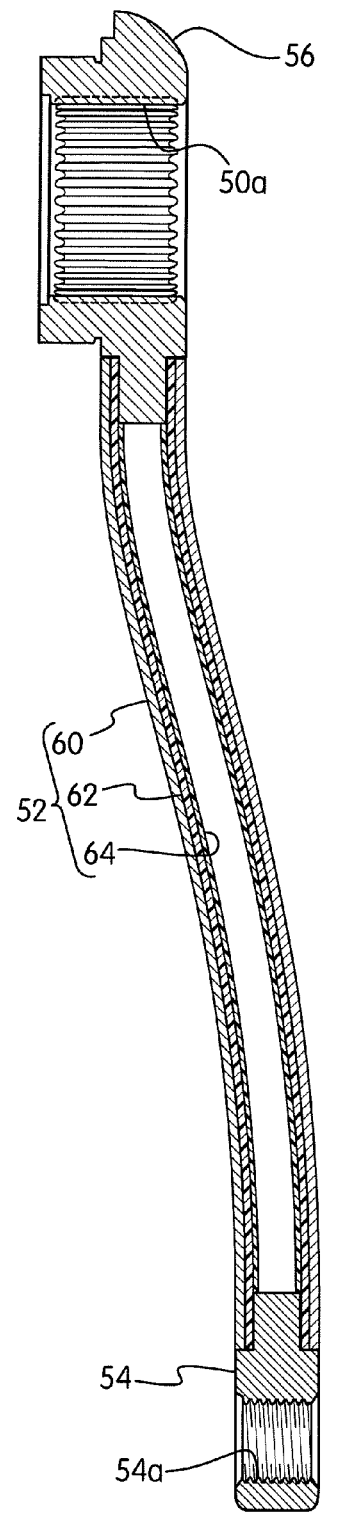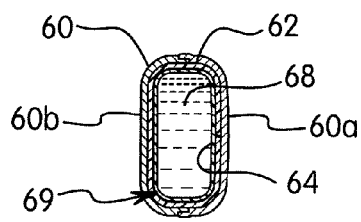
FIG. 11
FIG. 13
FIG. 14
FIG. 12

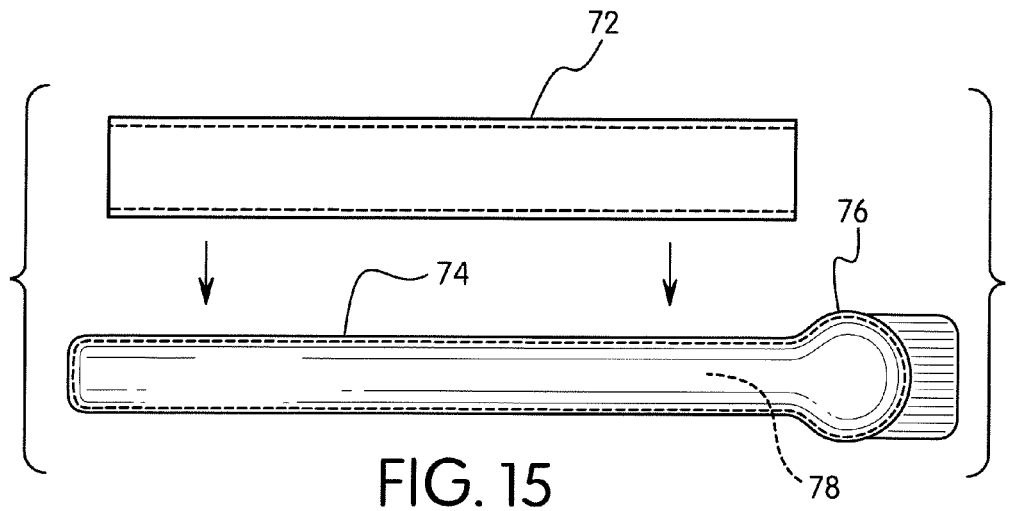
FIG. 15
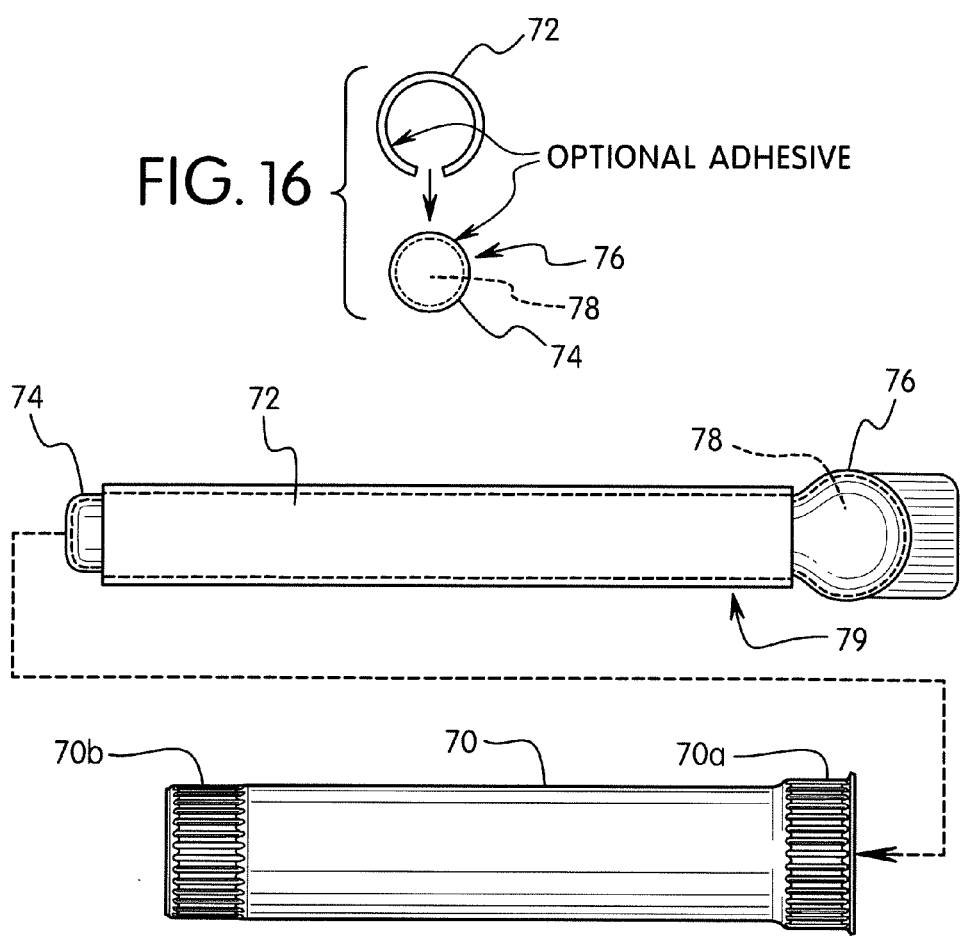
FIG. 16
FIG. 17

OPTIONAL ADHESIVE

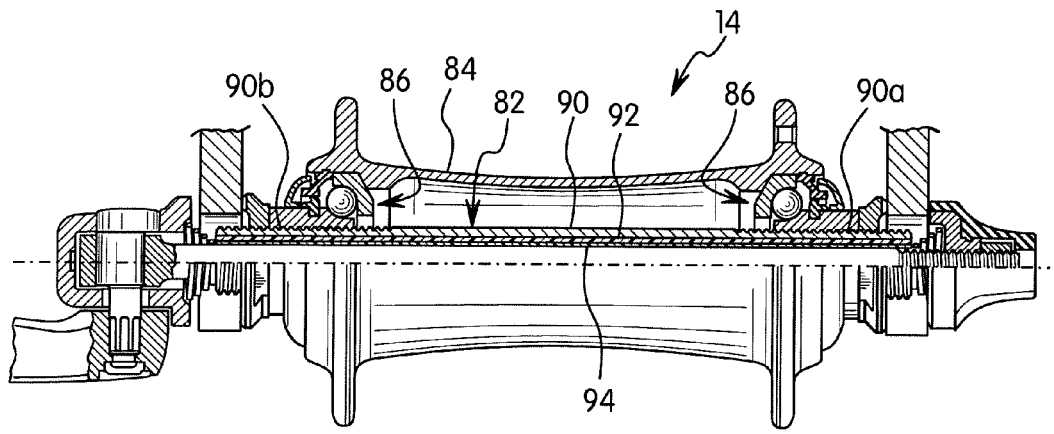
FIG. 24
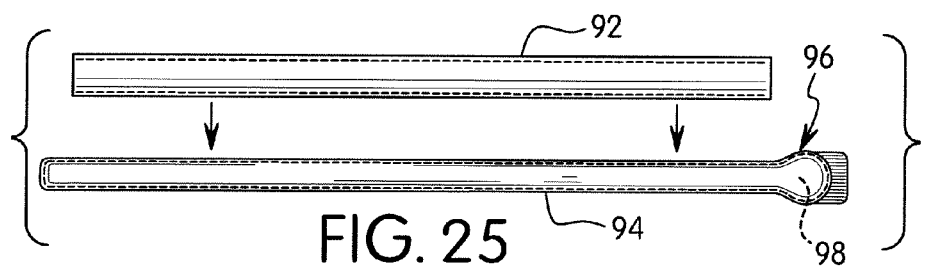
FIG. 25
FIG. 26
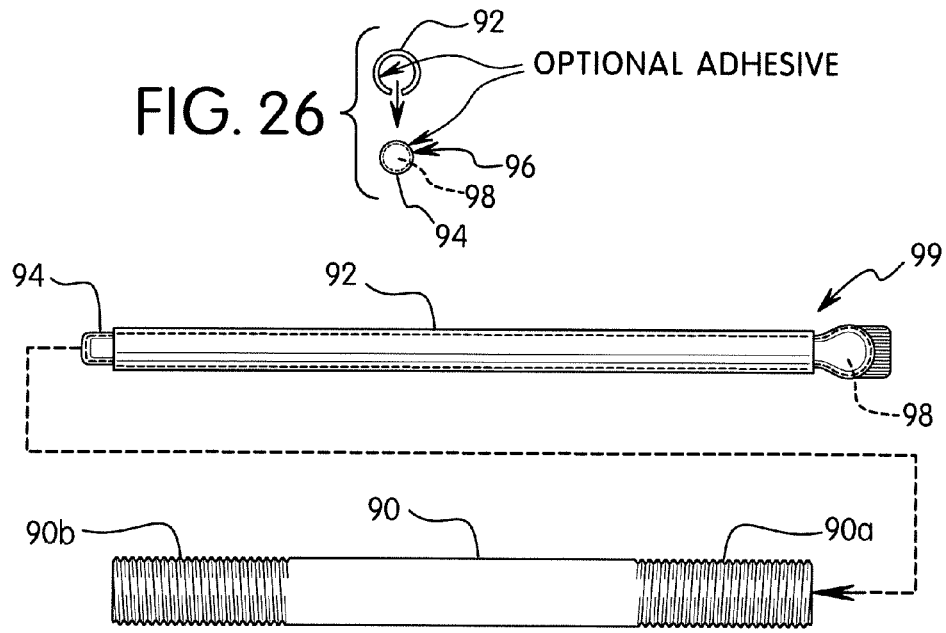
FIG. 27

HOLLOW COMPOSITE BICYCLE COMPONENT

BACKGROUND

1. Field of the Invention

This invention generally relates to a hollow composite bicycle component. More specifically, the present invention relates to a method of manufacturing a composite bicycle component to obtain a lightweight composite bicycle component.

2. Background Information

In the bicycling field, bicycle component manufactures are constantly trying to develop bicycle components that are lighter without sacrificing strength. In the past, many bicycle components were manufactured with solid members. For example, in the past, front crank sets often used solid crank arms that were forged metal members. These solid crank arms can be quite heavy depending on the material. Also in the past, bottom brackets and hubs often used solid metal axles. In more recent years, these solid metal axles have been made from lighter weight metal alloys and/or have been constructed as tubular members in order to reduce weight. In addition, various bicycle components have been made to include one or portions of a hard plastic material or a fiber reinforced material in order to reduce weight.

SUMMARY

One aspect is to provide a hollow composite bicycle component that is relatively lightweight, yet with sufficient strength.

In view of the state of the known technology, one aspect of the present disclosure is to provide a method for manufacturing a composite bicycle component that basically comprises: applying a fiber-reinforced polymer material around a pouched member containing an evaporable substance to obtain a FRP covered pouched member; disposing the FRP covered pouched member within a metallic member; and heating the FRP covered pouched member to expand the FRP covered pouched member due to an increase of an internal pressure resulting from the evaporable substance expanding within the pouched member so that the wrapped FRP material contacts an inner surface of the metallic member to obtain a composite hollow member.

Another aspect of the present disclosure is to provide a hollow composite bicycle component that basically comprises a hollow metallic member, a fiber-reinforced polymer member and a pouched heat-ductile member. The fiber-reinforced polymer member is positioned inside the hollow metallic member. The pouched heat-ductile member is positioned inside the fiber-reinforced polymer member. The fiber-reinforced polymer member is adhered to an inner surface of the hollow metallic member.

BRIEF DESCRIPTION OF THE DRAWINGS

Referring now to the attached drawings which form a part of this original disclosure:

FIG. 3 is a cross-sectional view of the crank assembly illustrated in FIG. 2 as seen along section line 3-3 of FIG. 2;

FIG. 4 is an enlarged, cross-sectional view of the right crank arm of the crank assembly illustrated in FIGS. 1 to 3 as seen along section line 4-4 of FIG. 2;

FIG. 5 is an exploded schematic elevational view of the method of applying the fiber-reinforced polymer material around the pouched heat-ductile member to obtain the FRP covered pouched member for forming the composite hollow member used in the crank arm;

FIG. 6 is an exploded schematic cross-sectional view of the method of applying the fiber-reinforced polymer material around the pouched heat-ductile member as seen along section line 6-6 of FIG. 5 to obtain the FRP covered pouched member for framing the composite hollow member used in the crank arm;

FIG. 7 is an exploded schematic elevational view of the method of disposing the FRP covered pouched member within the metallic member for forming the composite hollow member used in the crank arm;

FIG. 8 is an exploded schematic cross-sectional view of the method of disposing the FRP covered pouched member within the metallic member as seen along section line 8-8 of FIG. 7 for forming the composite hollow member used in the crank arm;

FIG. 9 is a schematic cross-sectional view of the FRP covered pouched member disposed within the metallic member for forming the composite hollow member used in the crank arm;

FIG. 10 is a schematic cross-sectional view of the FRP covered pouched member disposed within the metallic member as seen along section line 10-10 of FIG. 9 for forming the composite hollow member used in the crank arm;

FIG. 11 is a schematic cross-sectional view of the FRP covered pouched member disposed within the metallic member after heating the FRP covered pouched member to expand the FRP covered pouched member so that the wrapped FRP material contacts an inner surface of the metallic member to obtain the composite hollow member used in the crank arm;

FIG. 12 is a schematic longitudinal cross-sectional view of the FRP covered pouched member disposed within the metallic member as seen along section line 12-12 after heating the FRP covered pouched member to expand the FRP covered pouched member that the wrapped FRP material contacts an inner surface of the metallic member to obtain the composite hollow member used in the crank arm;

FIG. 13 is a schematic longitudinal cross-sectional view of the composite hollow member for use in the crank arm;

FIG. 14 is a schematic cross-sectional view of the crank arm (i.e., a hollow composite bicycle component) with the composite hollow member manufactured in accordance with the method schematically illustrated in FIGS. 5 to 13;

FIG. 15 is an exploded schematic elevational view of the method of applying the fiber-reinforced polymer material around the pouched heat-ductile member to obtain the FRP covered pouched member for forming the composite hollow member that is used as the crankshaft;

FIG. 16 is an exploded schematic end view of the method of applying the fiber-reinforced polymer material around the pouched heat-ductile member to obtain the FRP covered pouched member for forming the composite hollow member that is used as the crankshaft;

FIG. 17 is an exploded schematic elevational view of the method of disposing the FRP covered pouched member within the metallic member for forming the composite hollow member that is used as the crankshaft;

FIG. 24 is a partial, longitudinal cross-sectional view of the front hub illustrated in FIG. 1 having a composite hollow member that is used as the hub axle of the front hub;

FIG. 25 is an exploded schematic elevational view of the method of applying the fiber-reinforced polymer material around the pouched heat-ductile member to obtain the FRP covered pouched member for forming the composite hollow member that is used as the hub axle of the front hub;

FIG. 26 is an exploded schematic elevational view of the method of applying the fiber-reinforced polymer material around the pouched heat-ductile member to obtain the FRP covered pouched member for forming the composite hollow member that is used as the hub axle of the front hub;

FIG. 27 is an exploded schematic elevational view of the method of disposing the FRP covered pouched member within the metallic member for forming the composite hollow member that is used as the hub axle of the front hub;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
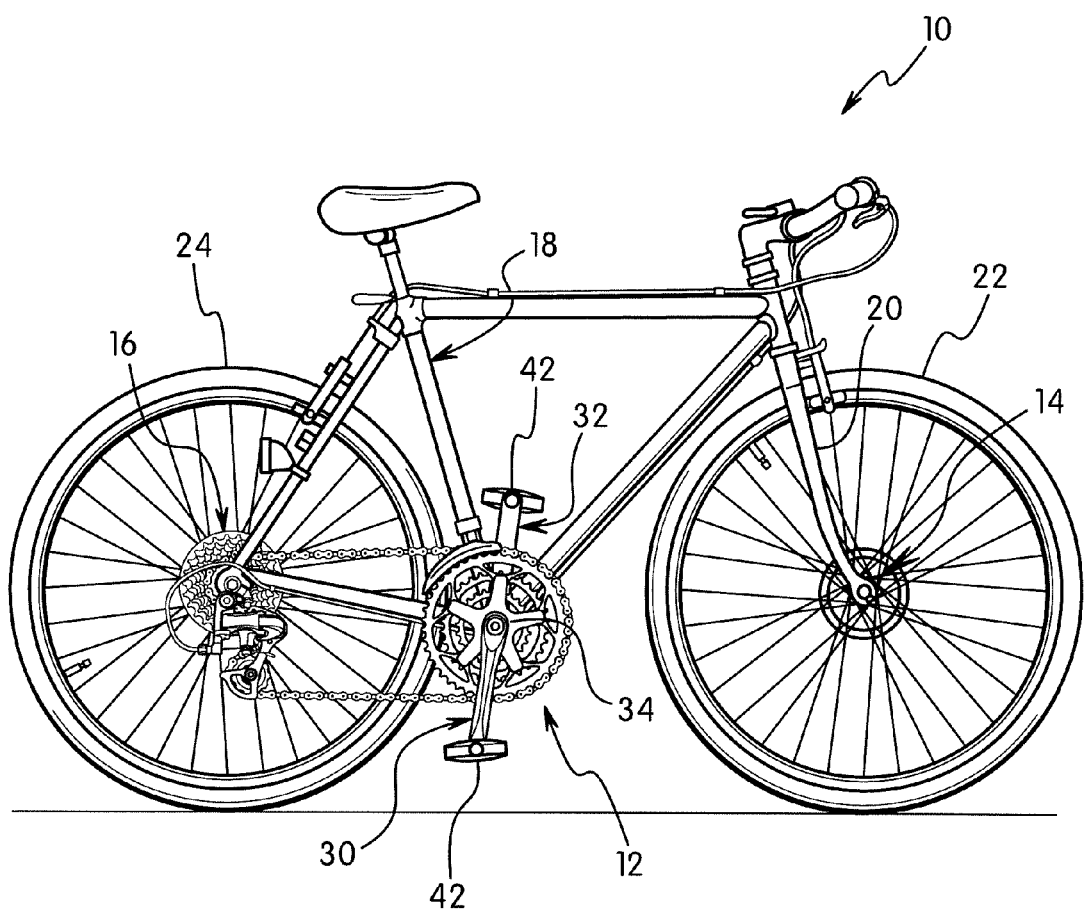
FIG. 1 is a side elevational view of a bicycle equipped with a pair of crank arms, a crankshaft and a pair of hubs that are manufactured in accordance with one embodiment.

Referring initially to FIG. 1, a bicycle 10 is illustrated that is equipped with a crank assembly 12, a front hub 14 and a rear hub 16 in accordance with one embodiment. The bicycle 10 has a diamond-shaped frame 18 with a front fork 20 pivotally coupled thereto. The crank assembly 12 is mounted to the frame 18 in a conventional manner as explained below. A front wheel 22 is mounted to the front fork 20 by the front hub 14. A rear wheel 24 is mounted to the rear end of the frame 18 by the rear hub 16.

Figure 2:
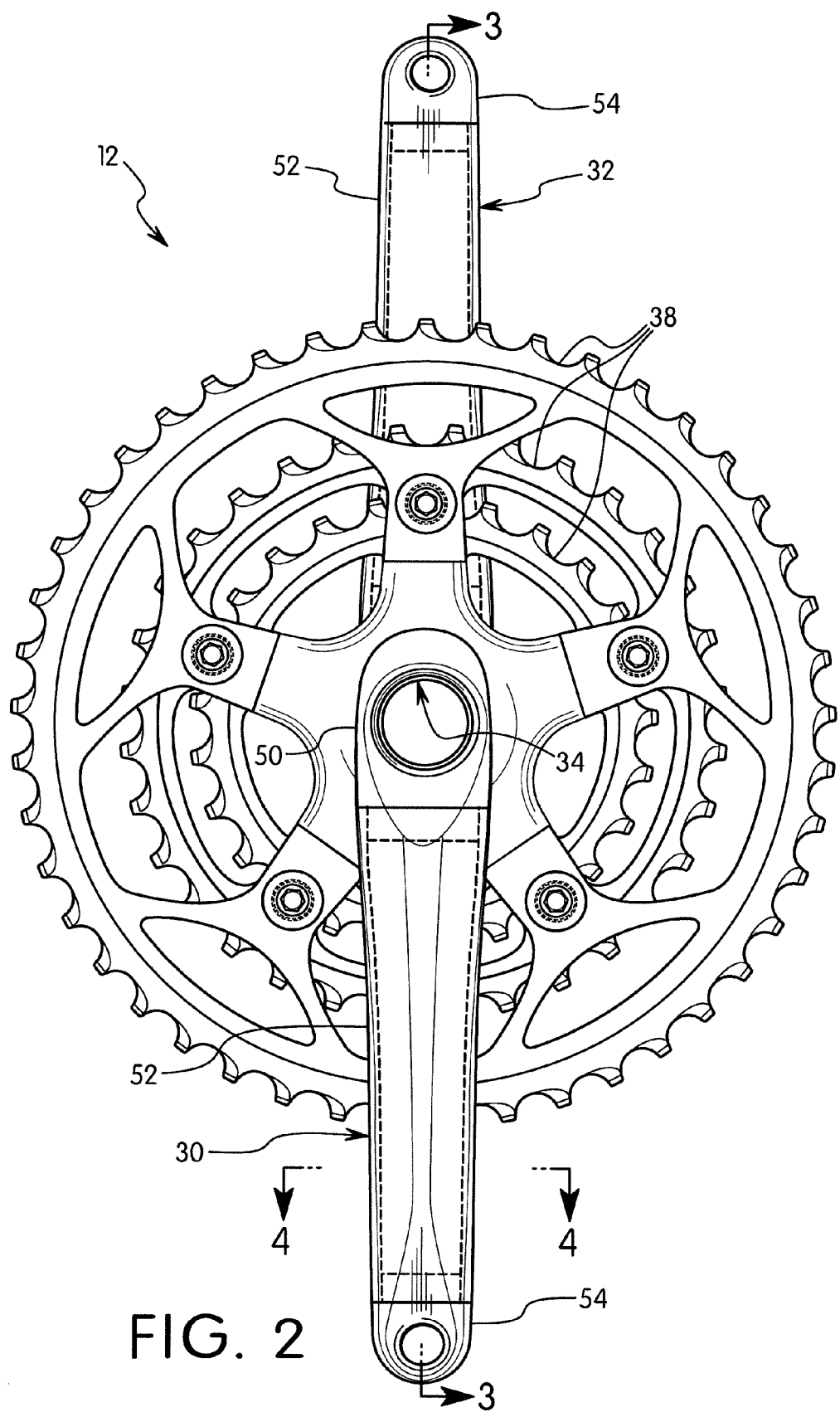
FIG. 2 is an enlarged side elevational view of the bicycle crank assembly that includes the crank arms and the crankshaft manufactured in accordance with one embodiment.

Referring now to FIGS. 2 and 3, the crank assembly 12 will now be discussed in more detail. Basically, the crank assembly 12 is supported on a bottom bracket shell 26 of the frame 18. The bottom bracket shell 26 is formed at the intersection of a seat tube, a down tube and a rear chain stays of the frame 18. The crank assembly 12 basically includes a right crank arm 30, a left crank arm 32, a crankshaft 34, a bottom bracket structure 36, three chainrings 38 and a chainring attachment part 40.

The crank arms 30 and 32 are non-rotatably mounted to opposite ends of the crankshaft 34. The bottom bracket structure 36 is a multi-part assembly that includes, among other parts, a pair of bearings. The bottom bracket structure 36 is mounted in the bottom bracket shell 26 of the frame 18 in a conventional manner. The crankshaft 34 is rotatably supported by the bottom bracket structure 36 within the bottom bracket shell 26. As seen in FIG. 1, pedals 42 are mounted to the free end of each of the crank arms 30 and 32 so the rider can rotate the crank arms 30 and 32 to propel the bicycle 10 in a conventional manner.

In the illustrated embodiment, the right crank arm 30 basically includes a crankshaft attachment part 50, an arm part 52 and a pedal attachment part 54. The crankshaft attachment part 50 includes a splined bore 50a that non-rotatably receives one end of the crankshaft 34. The pedal attachment part 54 includes a threaded bore 54a that threadedly receives a pedal shaft of one of the pedals 42. As seen in FIG. 2, in the illustrated embodiment, the crankshaft 34 is secured to the crankshaft attachment part 50 due to a flange provided at one end of the crankshaft 34 that contacts the crankshaft attachment part 50 and the left crank arm 32 being attached to the other end. The arm part 52 constitutes a composite hollow member of the right crank arm 30 such that the right crank arm 30 constitutes a hollow composite bicycle component. In the illustrated embodiment, the crankshaft attachment part 50 and the pedal attachment part 54 are bonded with an epoxy resin to opposite ends of the arm part 52 of the right crank arm 30.

The left crank arm 32 is constructed similar to the right crank arm 30. The left crank arm 32 includes the arm part 52 and the pedal attachment part 54 that is used in the right crank arm 30. However, the left crank arm 32 has a crankshaft attachment part 56 that is different from the crankshaft attachment part 50 in that it includes a pair of bolts 58 to fasten the left crank arm 32 on the crankshaft 34. In the illustrated embodiment, the crankshaft attachment part 56 and the pedal attachment part 54 are bonded with an epoxy resin to opposite ends of the arm part 52 of the left crank arm 32. Thus, the left crank arm 32 will not be discussed in detail herein.

As seen in FIG. 4, the arm part 52 is formed with three layers. In particular, the arm part 52 includes a hollow metallic member 60, a fiber-reinforced polymer member 62 and a heat-ductile member 64. The hollow metallic member 60 constitutes an outer layer with respect to the fiber-reinforced polymer member 62 and the heat-ductile member 64. In other words, the fiber-reinforced polymer member 62 is positioned inside the hollow metallic member 60. The fiber-reinforced polymer member 62 constitutes an intermediate or middle layer with respect to the hollow metallic member 60 and the heat-ductile member 64. The heat-ductile member 64 constitutes an inner layer with respect to the fiber-reinforced polymer member 62 and the fiber-reinforced polymer member 62. In other words, the heat-ductile member 64 is positioned inside the fiber-reinforced polymer member 62, with the fiber-reinforced polymer member 62 being adhered to an inner surface of the hollow metallic member 60. The thicknesses of the layers or members 60, 62 and 64 are not shown to scale. Likewise, the gap between the layers or members 60 and 62 is not shown to scale. The fiber-reinforced polymer member 62 is preferably adhered to the inner surface of the hollow metallic member by disposing the heat-ductile member 64 with the fiber-reinforced polymer member 62 disposed on the heat-ductile member 64 within the hollow metallic member 60, and then heating heat-ductile member 64 to expand the fiber-reinforced polymer member 62 into contact with the inner surface of the metallic member 60.

In the illustrated embodiment, the hollow metallic member 60 is constructed of a first hard rigid shell part 60a and a second hard rigid shell part 60b. The first and second hard rigid shell parts 60a and 60b are preferably formed of a lightweight metal such as aluminum or other suitable metal. The first and second hard rigid shell parts 60a and 60b mate together to form a tube with a uniform transverse cross section as seen in FIG. 4. While the internal dimension of the tube formed by the first and second hard rigid shell parts 60a and 60b is constant along its longitudinal length, it will be apparent from this disclosure that the internal dimension and the transverse cross section of the tube formed by the first and second hard rigid shell parts 60a and 60b can be non-uniformed as needed and/or desired. While the crank shaft attachment part 50 and the pedal attachment part 54 are illustrated separate members from each of the first and second hard rigid shell parts 60a and 60b, respectively, in the illustrated embodiment, each of the crank shaft attachment part 50 and the pedal attachment part 54 can also be formed as a one-piece, unitary member that is integrated with one of the first and second hard rigid shell parts 60a and 60b.

In the illustrated embodiment, the fiber-reinforced polymer member 62 is positioned inside the hollow metallic member 60 such that the outer surface of the fiber-reinforced polymer member 62 directly contacts the inner surface of the hollow metallic member 60. Optionally, an adhesive can be applied to either of the outer surface of the fiber-reinforced polymer member 62 or the inner surface of the metallic member 60 prior to disposing the fiber-reinforced polymer member 62 on the inner surface of the metallic member 60 as seen in FIG. 6. Alternatively, an adhesive can be applied to both of the mating surfaces of the metallic member 60 and the fiber-reinforced polymer member 62 prior to disposing the fiber-reinforced polymer member 62 on the inner surface of the metallic member 60.

The material of the fiber-reinforced polymer member 62 is often called a fiber-reinforced plastic or polymer (FRP), which is made of a polymer matrix reinforced with fibers. The fibers can be arranged as randomly oriented fibers and/or unidirectional fibers. The fibers are usually fiberglass, carbon, or aramid, while the polymer is usually an epoxy, vinylester or polyester thermosetting plastic. In the illustrated embodiment, the material of the fiber-reinforced polymer member 62 is a thin sheet of continuous reinforcement fibers impregnated with a thermoset resin or a thermoplastic resin, which is often called prepreg sheets. For example, in the illustrated embodiment, the fiber-reinforced polymer member 62 is a fiber reinforced synthetic material having an epoxy resin impregnated with carbon fibers. Also, while the fiber-reinforced polymer member 62 is a single layer that is wrapped around the heat-ductile member 64, it will be apparent from this disclosure that the multiple layers of unidirectional fibers can be arranged in the same or varying orientations relative to each other. In addition, the circumferential dimension of the fiber-reinforced polymer member 62 around the heat-ductile member 64 can be configured to provide for some overlap to account for the expansion of the heat-ductile member 64. The fiber-reinforced polymer member 62 (prepreg sheet) is a soft flexible cloth material at room temperature. However, when the fiber-reinforced polymer member 62 (prepreg sheet) is heated to 80° C. to 200° C., the resin of the material will initially develop a low viscosity such that the resin becomes an adhesive, and then will become hardened eventually during the heat treatment because the resin is a thermosetting resin. After the heat treatment, the overall thickness of the fiber-reinforced polymer member 62 will be in the range of about 0.3 to about 0.5 mm. Of course, it will be apparent from this disclosure that the fiber-reinforced polymer member 62 can include virtually any reinforcement fiber, with virtually any matrix resin that can carry out produce a reinforcing layer in accordance with the disclosed method. The thickness of the fiber-reinforced polymer member 62 can be varied to suit the desired requirements of the arm part 52.

As seen in FIGS. 5 to 14, the heat-ductile member 64 is formed from a pouched member 66 (also referred to as a pouched heat-ductile member), which contains an evaporable substance 68. In the illustrated embodiment, the evaporable substance 68 is not a gas while the pouched member 66 is in a non-expanded state. The pouched member 66 can contain either an evaporable liquid as the evaporable substance 68, an evaporable solid as the evaporable substance 68, or any combination thereof. For example, the pouched member 66 is formed of a low density polyethylene containing water (or ice) as the evaporable substance 68. In any event, in the illustrated embodiment, the evaporable substance 68 is a volatile substance which will vaporize when heated to expand the pouched member 66 with sufficient force to press the fiber-reinforced polymer member 62 against the inner surface of the metallic member 60.

Referring now to FIGS. 5 to 14, the method for manufacturing the right crank arm 30 (e.g., a composite bicycle component) with the arm part 52 (e.g., a composite hollow member) will now be discussed in more detail. As seen in FIGS. 5 to 8, the fiber-reinforced polymer member 62 is first wrapped around the pouched member 66 to obtain a FRP covered pouched member 69. Optionally, an adhesive can be applied on at least one of an outer surface of the pouched member 66 and a surface of the fiber-reinforced polymer member 62 that contacts the pouched member 66 prior to the applying of the fiber-reinforced polymer material around the pouched member 66.

Once the FRP covered pouched member 69 (the fiber-reinforced polymer member 62 disposed on the pouched member 66) is formed as seen in FIGS. 7 and 8, the FRP covered pouched member 69 is disposed between the first and second hard rigid shell parts 60a and 60b. The first and second hard rigid shell parts 60a and 60b can be fixed together prior to the FRP covered pouched member 69 being disposed between the first and second hard rigid shell parts 60a and 60b. Alternatively, first and second hard rigid shell parts 60a and 60b can be fixed together after the FRP covered pouched member 69 is disposed between the first and second hard rigid shell parts 60a and 60b. The first and second hard rigid shell parts 60a and 60b can be fixed together by an epoxy adhesive that is heat activated. In any event, the FRP covered pouched member 69 is disposed within the metallic member 60 with a gap formed between the inner surface of metallic member 60 and the outer surface of the FRP covered pouched member 69. Optionally, an adhesive can be applied on at least one of an outer surface of the FRP covered pouched member 69 and the inner surface of the metallic member 60 prior to the disposing of the FRP covered pouched member 69 within the metallic member 60.

Once the FRP covered pouched member 69 is disposed within the metallic member 60, heat is at least initially applied to at least the pouched member 66 for heating of the evaporable substance 68 within the pouched member 66 to expand the FRP covered pouched member 69 against the inner surface of metallic member 60. For example, heat is applied to the pouched member 66 at a temperature of at 80° C. to 200° C. such that the evaporable substance 68 becomes vaporizes to form a gas. Basically, this heating of at least the pouched member 66 causes an increase of an internal pressure of the pouched member 66 from the evaporable substance 68 expanding within the pouched member 66 so that the wrapped FRP polymer member 62 contacts an inner surface of the metallic member 60 to obtain the arm part 52 (e.g., a hollow composite bicycle component).

During applying heat to at least the pouched member 66, the heat is also applied to the fiber-reinforced polymer member 62 at the same time, which in the illustrated embodiment includes an epoxy resin (bonding material), such that the resin of the fiber-reinforced polymer member 62 becomes viscous to initially form an adhesive. During the heat treatment, because the resin of the fiber-reinforced polymer member 62 is a thermosetting resin, the fiber-reinforced polymer member 62 eventually hardens so that the outer surface of the fiber-reinforced polymer member 62 is directly bonded to the inner surface of the metallic member 60. Now, the ends of the pouched member 66 can be removed.

Referring now to FIGS. 2, and 15 to 24, the crankshaft 34 will now be discussed in more detail. As seen in FIG. 2, the crankshaft 34 is formed with three layers. In particular, the crankshaft 34 includes a hollow metallic member 70, a fiber-reinforced polymer member 72 and a heat-ductile member 74. The hollow metallic member 70 constitutes an outer layer with respect to the fiber-reinforced polymer member 72 and the heat-ductile member 74. In other words, the fiber-reinforced polymer member 72 is positioned inside the hollow metallic member 70. The fiber-reinforced polymer member 72 constitutes an intermediate or middle layer with respect to the hollow metallic member 70 and the heat-ductile member 74. The heat-ductile member 74 constitutes an inner layer with respect to the fiber-reinforced polymer member 72 and the fiber-reinforced polymer member 72. In other words, the heat-ductile member 74 is positioned inside the fiber-reinforced polymer member 72, with the fiber-reinforced polymer member 72 being adhered to an inner surface of the hollow metallic member 70. The fiber-reinforced polymer member 72 is preferably adhered to the inner surface of the hollow metallic member by disposing the heat-ductile member 74 with the fiber-reinforced polymer member 72 disposed on the heat-ductile member 74 within the hollow metallic member 70, and then heating heat-ductile member 74 to expand the fiber-reinforced polymer member 72 into contact with the inner surface of the metallic member 70.

Figure 23:
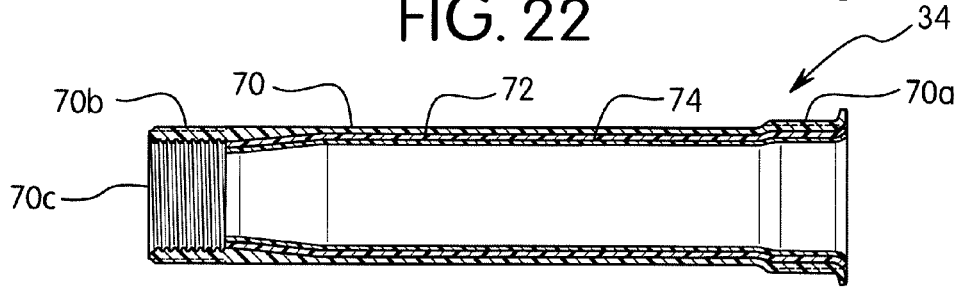
FIG. 23 is a longitudinal cross-sectional view of the crankshaft (i.e., the hollow composite bicycle component) manufactured in accordance with the method schematically illustrated in FIGS. 15 to 22.

In the illustrated embodiment, the hollow metallic member 70 is constructed as a tube from a lightweight metal such as aluminum or other suitable metal. The hollow metallic member 70 has a non-uniform transverse cross section with a non-uniform internal width as seen in FIGS. 18 to 23. While the internal dimension (e.g., internal width or diameter) of the hollow metallic member 70 fluctuates along its longitudinal length as needed, it will be apparent from this disclosure that the internal dimension and the transverse cross section of the hollow metallic member 70 can be uniformed as needed and/or desired. As seen in FIG. 17, the outer surface of the hollow metallic member 70 is provided with splines 70a and 70b at the opposite ends of the hollow metallic member 70 for non-rotatably mounting the crank arms 30 and 32, respectively. As seen in FIG. 23, the inner surface of the hollow metallic member 70 is provided with an internal thread 70c for receiving a bolt (FIG. 3) to secure the left crank arm 32 to the crankshaft 34.

In the illustrated embodiment, the fiber-reinforced polymer member 72 is positioned inside the hollow metallic member 70 such that the outer surface of the fiber-reinforced polymer member 72 directly contacts the inner surface of the hollow metallic member 70. Optionally, an adhesive can be applied to either of the outer surface of the fiber-reinforced polymer member 72 or the inner surface of the metallic member 70 prior to disposing the fiber-reinforced polymer member 72 on the inner surface of the metallic member 70 as seen in FIG. 8. Alternatively, an adhesive can be applied to both of the mating surfaces of the metallic member 70 and the fiber-reinforced polymer member 72 prior to disposing the fiber-reinforced polymer member 72 on the inner surface of the metallic member 70.

The material of the fiber-reinforced polymer member 72 is the same as the fiber-reinforced polymer member 62 of the arm part 52, as discussed above. Other that the shape and size of the fiber-reinforced polymer member 72, the fiber-reinforced polymer member 72 is the same as the fiber-reinforced polymer member 62 of the arm part 52, as discussed above. Thus, the fiber-reinforced polymer member 72 will not be discussed in further detail for the sake of brevity.

The heat-ductile member 74 is formed from a pouched member 76 (also referred to as a pouched heat-ductile member), which contains an evaporable substance 78, which is the same as the evaporable substance 68. Other that the shape and size of the heat-ductile member 74, the pouched member 76 is the same as the pouched member 66 of the arm part 52, as discussed above.

Referring now to FIGS. 15 to 23, the method for manufacturing the crankshaft 34 (e.g., a composite bicycle component) is basically the same as the method for manufacturing the arm part 52 as discussed above. As seen in FIGS. 15 and 16, the fiber-reinforced polymer member 72 is first wrapped around the pouched member 76 to obtain a FRP covered pouched member 79. Optionally, an adhesive can be applied on at least one of an outer surface of the pouched member 76 and a surface of the fiber-reinforced polymer member 72 that contacts the pouched member 76 prior to the applying of the fiber-reinforced polymer material around the pouched member 76 as seen in FIG. 16.

Figure 18:
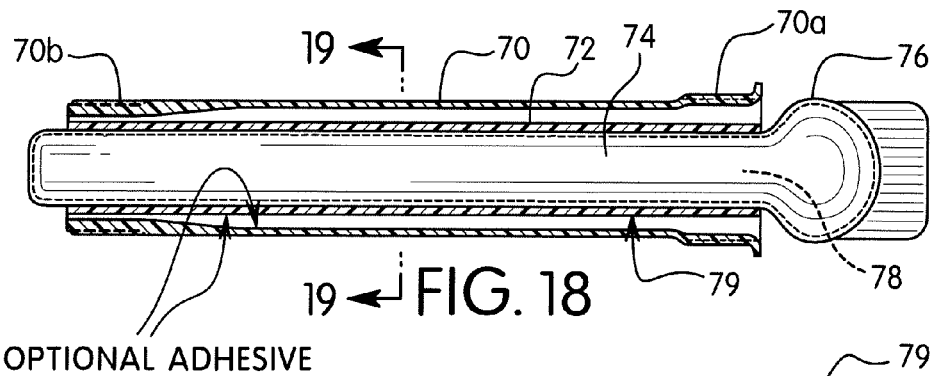
FIG. 18 is a schematic longitudinal cross-sectional view of the FRP covered pouched member disposed within the metallic member for forming the composite hollow member that is used as the crankshaft.
Figure 19:
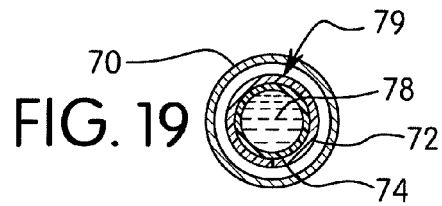
FIG. 19 is a schematic transverse cross-sectional view of the FRP covered pouched member disposed within the metallic member as seen along section line 19-19 of FIG. 18 for forming the composite hollow member that is used as the crankshaft.
Figure 20:
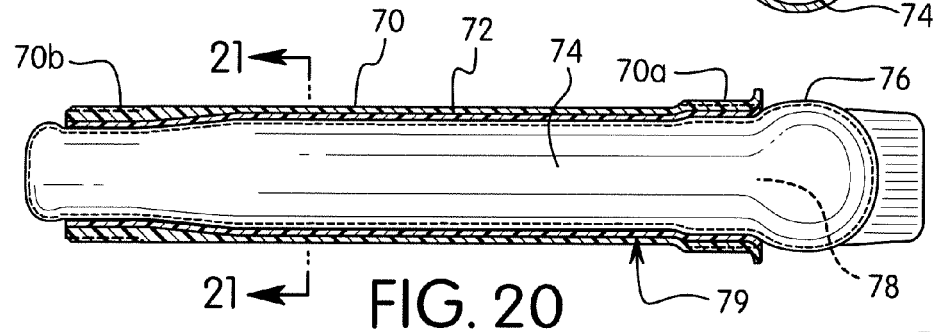
FIG. 20 is a schematic longitudinal cross-sectional view of the FRP covered pouched member disposed within the metallic member after heating the FRP covered pouched member to expand the FRP covered pouched member so that the wrapped FRP material contacts an inner surface of the metallic member to obtain the composite hollow member that is used as the crankshaft.
Figure 21:
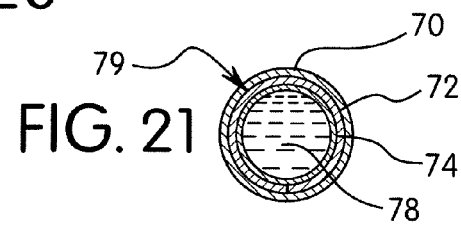
FIG. 21 is a schematic transverse cross-sectional view of the FRP covered pouched member disposed within the metallic member as seen along section line 21-21 after heating the FRP covered pouched member to expand the FRP covered pouched member that the wrapped FRP material contacts an inner surface of the metallic member to obtain the composite hollow member that is used as the crankshaft.
Figure 22:
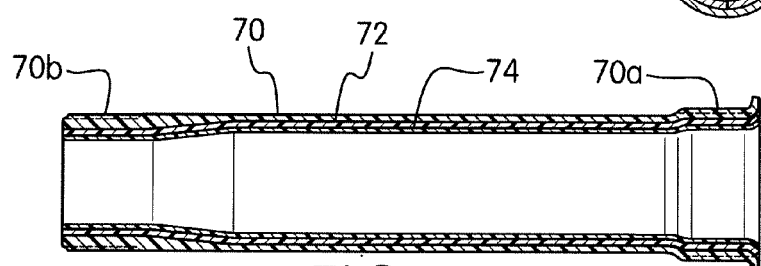
FIG. 22 is a longitudinal cross-sectional view of the composite hollow member manufactured in accordance with the method schematically illustrated in FIGS. 15 to 21.

Once the FRP covered pouched member 79 (the fiber-reinforced polymer member 72 disposed on the pouched member 76) is formed as seen in FIGS. 7 and 18, the FRP covered pouched member 79 is disposed within the metallic member 70 with a gap formed between the inner surface of metallic member 70 and the outer surface of the FRP covered pouched member 79. Optionally, an adhesive can be applied on at least one of an outer surface of the FRP covered pouched member 79 and the inner surface of the metallic member 70 prior to the disposing of the FRP covered pouched member 79 within the metallic member 70 as seen in FIG. 18.

Once the FRP covered pouched member 79 is disposed within the metallic member 70, heat is at least initially applied to at least the pouched member 76 for heating of the evaporable substance 78 within the pouched member 76 to expand the FRP covered pouched member 79 against the inner surface of metallic member 70. For example, heat is applied to the pouched member 76 at a temperature of at 80° C. to 200° C. such that the evaporable substance 78 becomes vaporizes to form a gas. Basically, this heating of at least the pouched member 76 causes an increase of an internal pressure of the pouched member 76 from the evaporable substance 78 expanding within the pouched member 76 so that the wrapped FRP polymer member 72 contacts an inner surface of the metallic member 70 to obtain the arm part 52 (e.g., a hollow composite bicycle component).

During applying heat to at least the pouched member 76, the heat is also applied to the fiber-reinforced polymer member 72 at the same time, which in the illustrated embodiment includes an epoxy resin (bonding material), such that the resin of the fiber-reinforced polymer member 72 becomes viscous to initially form an adhesive. During the heat treatment, because the resin of the fiber-reinforced polymer member 72 is a thermosetting resin, the fiber-reinforced polymer member 72 eventually hardens so that the outer surface of the fiber-reinforced polymer member 72 is directly bonded to the inner surface of the metallic member 70. Now, the ends of the pouched member 76 can be removed.

Referring now to FIGS. 24 to 32, the front hub 14 will now be discussed in more detail. The front hub 14 basically includes a hub axle 82, a hub shell 84, a pair of bearings 86. The front hub 14 is conventional, except for the hub axle 82. Accordingly, the front hub 14 will not be explained and/or illustrated in detail herein, except as related to the front hub axle 82. Of course, it will be apparent to those skilled in the bicycle art from this disclosure that the hub axle 82 can be used in other types of bicycle hubs, such as the rear hub 16, as needed and/or desired. In other words, the hub 14 is merely one example of a hub utilizing the hub axle 82.

The hub axle 82 is constructed in a manner identical to the crankshaft 34. The hub axle 82 includes is formed with three layers. In particular, the hub axle 82 includes a hollow metallic member 90, a fiber-reinforced polymer member 92 and a heat-ductile member 94. The members 90, 92 and 94 are modified versions (e.g. shapes, sizes, etc.) of the members 60, 62 and 64. The members 90, 92 and 94 are constructed of the same materials and using the same manufacturing techniques as the members 60, 62 and 64, respectively. In view of the similarity between the crankshaft 34 and the hub axle 82, the hub axle 82 will not be explained in as much detail herein. Rather, it will be apparent to those skilled in the bicycle art from this disclosure that the descriptions of the crankshaft 34 also apply to the hub axle 82, except as explained and/or illustrated herein.

The hollow metallic member 90 constitutes an outer layer with respect to the fiber-reinforced polymer member 92 and the heat-ductile member 94. In other words, the fiber-reinforced polymer member 92 is positioned inside the hollow metallic member 90. The fiber-reinforced polymer member 92 constitutes an intermediate or middle layer with respect to the hollow metallic member 90 and the heat-ductile member 94. The heat-ductile member 94 constitutes an inner layer with respect to the fiber-reinforced polymer member 92 and the fiber-reinforced polymer member 92. In other words, the heat-ductile member 94 is positioned inside the fiber-reinforced polymer member 92, with the fiber-reinforced polymer member 92 being adhered to an inner surface of the hollow metallic member 90. The fiber-reinforced polymer member 92 is preferably adhered to the inner surface of the hollow metallic member by disposing the heat-ductile member 94 with the fiber-reinforced polymer member 92 disposed on the heat-ductile member 94 within the hollow metallic member 90, and then heating heat-ductile member 94 to expand the fiber-reinforced polymer member 92 into contact with the inner surface of the metallic member 90.

Figure 28:
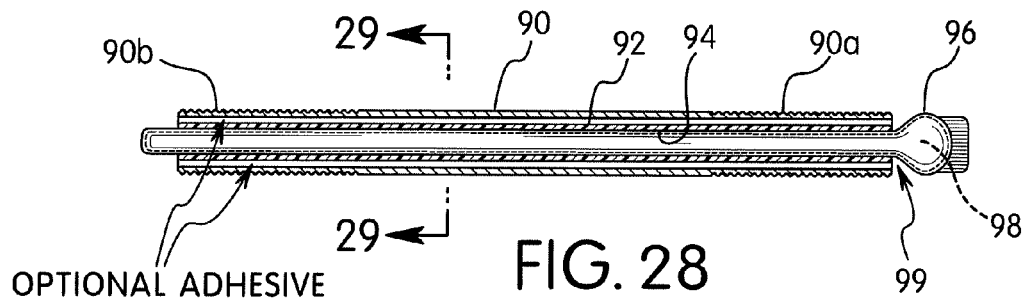
FIG. 28 is a schematic longitudinal cross-sectional view of the method of disposing the FRP covered pouched member within the metallic member for forming the composite hollow member that is used as the hub axle of the front hub.
Figure 29:
FIG. 29 is a schematic transverse cross-sectional view of the FRP covered pouched member disposed within the metallic member as seen along section line 29-29 of FIG. 28 for forming the composite hollow member used in the hub axle.
Figure 30:
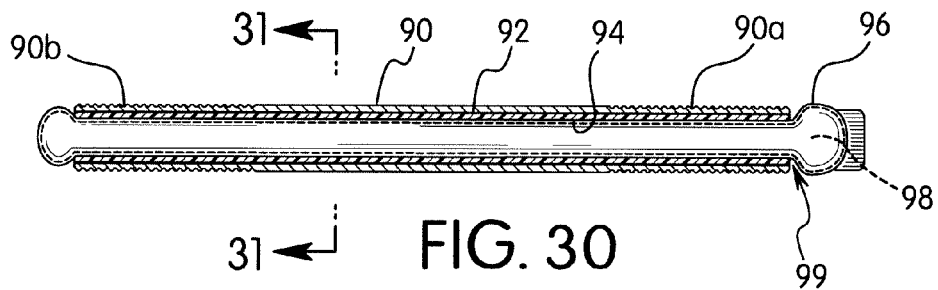
FIG. 30 is a schematic longitudinal cross-sectional view of the FRP covered pouched member disposed within the metallic member for forming the composite hollow member that is used as the hub axle of the front hub.
Figure 31:
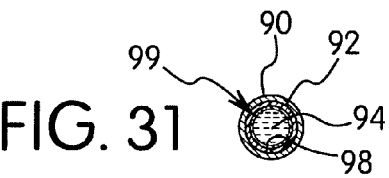
FIG. 31 is a schematic transverse cross-sectional view of the FRP covered pouched member disposed within the metallic member as seen along section line 31-31 after heating the FRP covered pouched member to expand the FRP covered pouched member so that the wrapped FRP material contacts an inner surface of the metallic member to obtain the composite hollow member that is used as the hub axle of the front hub.
Figure 32:
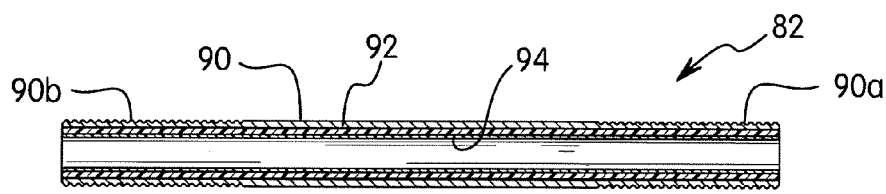
FIG. 32 is a cross-sectional view of the hub axle (i.e., a composite hollow member) manufactured in accordance with the method schematically illustrated in FIGS. 25 to 31.

In the illustrated embodiment, the hollow metallic member 90 is constructed as a tube from a lightweight metal such as aluminum or other suitable metal. The outer surface of the hollow metallic member 90 is provided with a pair of external threads 90a and 90b for securing the bearings 86 thereto. The hollow metallic member 90 has a uniform transverse cross section as seen in FIGS. 28 to 30. While the internal dimension (e.g., internal width or diameter) of the hollow metallic member 90 remains constant along its longitudinal length, it will be apparent from this disclosure that the internal dimension and the transverse cross section of the hollow metallic member 90 can be non-uniformed as needed and/or desired.

In the illustrated embodiment, the fiber-reinforced polymer member 92 is positioned inside the hollow metallic member 90 such that the outer surface of the fiber-reinforced polymer member 92 directly contacts the inner surface of the hollow metallic member 90. Optionally, an adhesive can be applied to either of the outer surface of the fiber-reinforced polymer member 92 or the inner surface of the metallic member 90 prior to disposing the fiber-reinforced polymer member 92 on the inner surface of the metallic member 90 as seen in FIG. 28. Alternatively, an adhesive can be applied to both of the mating surfaces of the metallic member 90 and the fiber-reinforced polymer member 92 prior to disposing the fiber-reinforced polymer member 92 on the inner surface of the metallic member 90.

The material of the fiber-reinforced polymer member 92 is the same as the fiber-reinforced polymer member 62 of the arm part 52, as discussed above. Other that the shape and size of the fiber-reinforced polymer member 92, the fiber-reinforced polymer member 92 is the same as the fiber-reinforced polymer member 62 of the arm part 52, as discussed above. Thus, the fiber-reinforced polymer member 92 will not be discussed in further detail for the sake of brevity.

The heat-ductile member 94 is formed from a pouched member 96 (also referred to as a pouched heat-ductile member), which contains an evaporable substance 98, which is the same as the evaporable substance 68. Other that the shape and size of the heat-ductile member 94, the pouched member 96 is the same as the pouched member 66 of the arm part 52, as discussed above.

Referring now to FIGS. 25 to 32, the method for manufacturing the hub axle 82 (e.g., a composite bicycle component) is basically the same as the method for manufacturing the arm part 52 as discussed above. As seen in FIGS. 25 and 26, the fiber-reinforced polymer member 92 is first wrapped around the pouched member 96 to obtain a FRP covered pouched member 99. Optionally, an adhesive can be applied on at least one of an outer surface of the pouched member 96 and a surface of the fiber-reinforced polymer member 92 that contacts the pouched member 96 prior to the applying of the fiber-reinforced polymer material around the pouched member 96 as seen in FIG. 26.

Once the FRP covered pouched member 99 (the fiber-reinforced polymer member 92 disposed on the pouched member 96) is formed as seen in FIG. 27, the FRP covered pouched member 99 is disposed within the metallic member 90 with a gap formed between the inner surface of metallic member 90 and the outer surface of the FRP covered pouched member 99. Optionally, an adhesive can be applied on at least one of an outer surface of the FRP covered pouched member 99 and the inner surface of the metallic member 90 prior to the disposing of the FRP covered pouched member 99 within the metallic member 90 as seen in FIG. 28.

Once the FRP covered pouched member 99 is disposed within the metallic member 90, heat is at least initially applied to at least the pouched member 96 for heating of the evaporable substance 98 within the pouched member 96 to expand the FRP covered pouched member 99 against the inner surface of metallic member 90. For example, heat is applied to the pouched member 96 at a temperature of at 80° C. to 200° C. such that the evaporable substance 98 becomes vaporizes to form a gas. Basically, this heating of at least the pouched member 96 causes an increase of an internal pressure of the pouched member 96 from the evaporable substance 98 expanding within the pouched member 96 so that the wrapped FRP polymer member 92 contacts an inner surface of the metallic member 90 to obtain the hub axle 82 (e.g., a hollow composite bicycle component).

During applying heat to at least the pouched member 96, heat is also applied to the fiber-reinforced polymer member 92 at the same time, which in the illustrated embodiment includes an epoxy resin (bonding material), such that the resin of the fiber-reinforced polymer member 92 becomes viscous to initially form an adhesive. During the heat treatment, because the resin of the fiber-reinforced polymer member 92 is a thermosetting resin, the fiber-reinforced polymer member 92 eventually hardens so that the outer surface of the fiber-reinforced polymer member 92 is directly bonded to the inner surface of the metallic member 90. Now, the ends of the pouched member 96 can be removed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them, unless specifically requiring direct contact. Thus, the foregoing descriptions of the embodiments according to the present invention are provided for illustration only, and not for the purpose of limiting the invention as defined by the appended claims and their equivalents.

What is claimed is:

1. A method for manufacturing a composite bicycle component comprising:
   applying a fiber-reinforced polymer material around a pouched member containing an evaporable substance to obtain a FRP covered pouched member;
   disposing the FRP covered pouched member within a metallic member after the applying of the fiber-reinforced polymer material around the pouched member;
   heating the FRP covered pouched member to expand the FRP covered pouched member due to an increase of an internal pressure resulting from the evaporable substance expanding within the pouched member so that the fiber-reinforced polymer material bonds to an inner surface of the metallic member to obtain a composite hollow member in which the pouched member is adhered to the inner surface of the metallic member; and
   removing ends of the pouched member such that a portion of the pouched member adhered to the inner surface of the metallic member forms a part of the composite bicycle component after manufacture.

2. The method according to claim 1, wherein
   the pouched member includes an evaporable liquid as the evaporable substance.

3. The method according to claim 1, wherein
   the pouched member includes an evaporable solid as the evaporable substance.

4. The method according to claim 1, further comprising
   applying adhesive on at least one of an outer surface of the FRP covered pouched member and the inner surface of the metallic member prior to the disposing of the FRP covered pouched member within the metallic member.

5. The method according to claim 1, further comprising
   applying adhesive on at least one of an outer surface of the pouched member and a surface of the fiber-reinforced polymer material that contacts the pouched member prior to the applying of the fiber-reinforced polymer material around the pouched member.

6. The method according to claim 1, further comprising
   using the composite hollow member as at least a part of a bicycle crank arm that constitutes the composite bicycle component.

7. The method according to claim 1, further comprising
   using the composite hollow member as at least a part of a bicycle crankshaft that constitutes the composite bicycle component.

8. The method according to claim 1, further comprising
   using the composite hollow member as at least a part of a bicycle huh axle that constitutes the composite bicycle component.

* * * * *